INVENTORS
DOROTHY L. SCHNABEL
ALAN D. SNYDER
BY David E. Lovejoy
AGENT 3,533,082

INSTRUCTION RETRY APPARATUS INCLUDING MEANS FOR RESTORING THE ORIGINAL CONTENTS OF ALTERED SOURCE OPERANDS

Dorothy L. Schnabel, Poughkeepsie, and Alan D. Snyder, Hopewell Junction, N.Y., assignors to International Business Machines Corporation, Armonk, N.Y., a corporation of New York Filed Jan. 15, 1968, Ser. No. 697,740
Int. Cl. G06f *11/00*
U.S. Cl. 340—172.5 13 Claims

ABSTRACT OF THE DISCLOSURE

Disclosed in the environment of a data processing system is a backup store for saving operands during normal instruction execution including a backup store address register for addressing the backup store.

Upon error detection, an instruction retry is effected which is transparent to the computer program and which is implemented by restoring those operands to storage from the backup store which were destroyed during a previously unsuccessful attempt at error-free instruction execution.

CROSS-REFERENCES TO RELATED APPLICATIONS (1) "Instruction Retry Byte Counter," by D. J. Lang et al., application Ser. No. 698,595 filed Jan. 17, 1968 and assigned to the same assignee as this application.

(2) "Data Processing Machine Function Indicator," by M. W. Bee et al., application Ser. No. 697,742 filed Jan. 15, 1968 and assigned to the same assignee as this application.

(3) "Data Processing System Execution Retry Control," by M. W. Bee et al., application Ser. No. 697,738 filed Jan. 15, 1968 and assigned to the same assignee as this application.

BACKGROUND OF THE INVENTION

The invention relates to the field of instruction-controlled digital computers. Instructions cause a computer to operate upon data to carry out a desired data manipulation. A group of instructions form a program. The program normally has its instructions sequentially executed, one at a time, to carry out a complete data manipulation.

Data processing systems generally consist of input/output units (I/O), a central processing unit (CPU), storage units and control units. Data is fed to and from the system through the input/output units and is stored in the stoage units. Instructions are executed in the CPU using data fetched from storage or supplied by I/O, all under control of the control unit. In such a system, malfunctions of many types may occur during any phase of the operation. These malfunctions cause undesirable errors in the data manipulation and the errors must be accounted for.

Malfunctions or errors can be classified as either short-lived or long-lived and are designated "transient" (intermittent) or "permanent" (solid, hard), respectively. A transient error may, for exmaple, be the result of a sudden fluctuation in the power supply or the result of a momentary presence of electric or magnetic noise in or near the system. A permanent error may, for example, result from the breakdown of a component such as a transistor or diode. Transient errors which occur frequently enough may, or course, be classified as permanent errors.

This invention is particularly directed to apparatus in a data processing system for overcoming the effects of transient errors and for obtaining a correct data manipulation in spite of the occurrence of transient errors.

A number of prior art techniques have been employed in an attempt to overcome the transient error problem. One such technique employs the concept of hardware redundancy, that is, using two or more computer systems or subsystems to simultaneously perform the same data manipulation. For example, two completely different computer systems can be programmed to carry out the same calculations and, if one of the two systems fails, there is a high probability that the other one did not. The data result obtained from the non-failing system, of course, is then used. While this redundancy concept can be employed on a systems level, it can be also employed on a subsystem level, for example, where duplicate central processing units share the same input/output, storage, and control units. Although this redundancy approach may sometimes be desirable, the cost of duplicating systems or subsystems is prohibitive and normally not justifiable.

Another approach to the problem of transient errors is to stop processing completely upon detection of an error and restarting over again from the beginning. This restarting is accomplished by checking the integrity of data and reloading the program with an initial program load (IPL). This operation can be characterized as a restart on error at the IPL level. Since it may take considerable time to reload the computer and since all of the operating time that was invested prior to the error is wasted, this approach of retry by restart at IPL makes an inefficient use of computer time.

Another method employed for overcoming the transient error problem has been carried out using the programed retry technique called "check pointing." Using this approach, every program must be written to incorporate retry provisions which include insertion of checkpoints within a computer program and instructions for saving all system data and control information at each checkpoint until the next checkpoint is reached. When an error occurs, the system is returned under program control, to its condition at the last checkpoint. The data and control information which was saved at the last checkpoint is employed to restore the system. After restoration, the operation is restarted. If the transient error does not reappear, of course, normal instruction execution proceeds. Although this programmed retry technique works well in some environments, it has a tendency to degrade system performance because of the time required to store away information at checkpoint time even when no errors are occurring. Additionally, programed retry has the fault of requiring a programer to incorporate the retry provisions in every program.

Another approach to the transient error problem is embodied in the hardware retry technique disclosed by Montgomery in U.S. Pat. 3,248,697. In the Montgomery system, error detection circuits monitor the execution of the instruction. Each instruction has a threshold point after which execution may not be retried because, during the partial instruction execution, source data upon which execution is dependent has been modified so that it is no longer available for retry. More succintly, retry is impossible after source data is changed. If the error occurs before the threshold has been reached for the particular instruction, the machine is immediately stopped and a retry of that instruction is carried out. This hardware retry is transparent to the program in that no program instructions are necessary to carry out the retry. However, if the threshold has been passed for the particular instruction, no retry is possible. While the Montgomery hardware retry technique is significant in that no system degradation occurs absent an error, it has the fault that after the threshold has been passed, the instruction cannot be retried and a time wasting program reload or checkpointing technique must be resorted to with the attendant disadvantages as discussed above.

SUMMARY OF THE INVENTION

In light of the problems attendant prior art data processing systems, the present invention is an apparatus which overcomes the problems of transient errors by implementing instruction retry at any time that an error occurs during the execution of an instruction. The present invention specifically includes the capability of retrying instructions upon error detection even after source data has been changed. The term "source data" is defined as any data which is necessary for the execution of an instruction.

More particularly, the present invention is a retry apparatus for use in data processing systems which employ "store-in-place" or storage to storage (SS) instructions. A store-in-place instruction is defined as an instruction which fetches one or more operands from storage to the central processing unit, manipulates the operand or operands to form a result, and stores that result at one of the initial operand locations in storage. The present invention achieves retry of store-in-place instructions by providing a backup store for storing all operands which may be destroyed when results are stored back to memory. The backup store is filled during the normal fetch operation of the operand simultaneously with the gating of the operand to its normal place in the central processing unit. The backup store is addressed by a backup store address register (pointer register) which obtains an address, during each normal operand fetch, corresponding to the fetched operands location in storage. Accordingly, operands stored in the backup store are located in backup store addresses which have a one-for-one relationship with the storage addresses of the operand field to which results will be stored during the current instruction execution.

When an error is detected by the normal error detection circuitry of the data processing system, the system control unit inhibits further processing, restores the instruction address of the instruction to be retried into the instruction address register and performs other "housecleaning" operations. With the address of the instruction to be retried restored, the normal I-fetch routines are carried out in the normal processing manner up until a point where the source operands are to be addressed for processing. Since these source operands may have been changed, a source data change (SDC) trigger is interrogated. If the SDC trigger has been set indicating that at least one source operand was overwritten during a prior erroneous attempt at instruction execution, the normal address generation circuitry is used in conjunction with the backup store address register to gate the operands from the backup store into their correct location in storage. After the storage has been restored, the instruction is retried in the same manner as if no error had occurred. If another error occurs, the retry apparatus again functions in the same manner as previously indicated. Any number, N, of retry attempts may be carried out. After the Nth unsuccessful retry, the error may be defined as permanent and no further retry attempted. If the error is transient, however, one or more retry attempts will usually enable the error-free execution of the instruction. If the latter occurs, normal processing is resumed.

It is apparent from the above summary of the invention that a hardware apparatus is provided which achieves the objective of instruction retry on error where the retry is transparent to the program, causes no degradation of system performance absent the occurrence of an error, and is carried out even when a source data change occurred during the previous attempted instruction execution. Additionally, the present invention requires a minimum of backup circuitry. In achieving these objectives, the present invention is an improvement over all of the prior art approaches discussed under the above Background of the Invention.

The foregoing and other objective, features and advantages of the invention will be apparent from the following more particular description of the preferred embodiments of the invention as illustrated in the accompanying drawings.

BASIC ENVIRONMENTAL SYSTEM

The present invention is for use in a data processing system typically including storage, a central process unit (CPU), a system control unit and some form of input/output (I/O) unit. Such a system is described in the following references:

U.S. patent application entitled, "Improved Program Suspension System," by Matthew A. Krygowski and Thomas S. Stafford, Ser. No. 573,246, now U.S. Pat. No. 3,453,600 filed Aug. 18, 1966, and having the same assignee as the present invention.

"IBM System/360 Principles of Operation," Systems Reference Library, Form A22–6821.

"System/360 Model 50, Comprehensive Introduction," IBM Field Engineering Manual of Instruction, Form 223–2821.

"System/360 Model 50, RS, SI, SS Instructions," IBM Field Engineering Manual of Instruction, Form 223–2825.

"Microprogramming Manual for the IBM System/360 Model 50" by S. S. Husson, Oct. 2, 1967, Technical Report: TR 00.1479–1, IBM Systems Development Division, Poughkeepsie, N.Y.

The details of the basic environmental system as disclosed in the above references are hereby incorporated by reference in this specification for the purpose of teaching the operation of a basic environmental system. Additional attention will be directed to those references hereinafter where appropriate to further identify details helpful in understanding the system operation.

Figure 1:
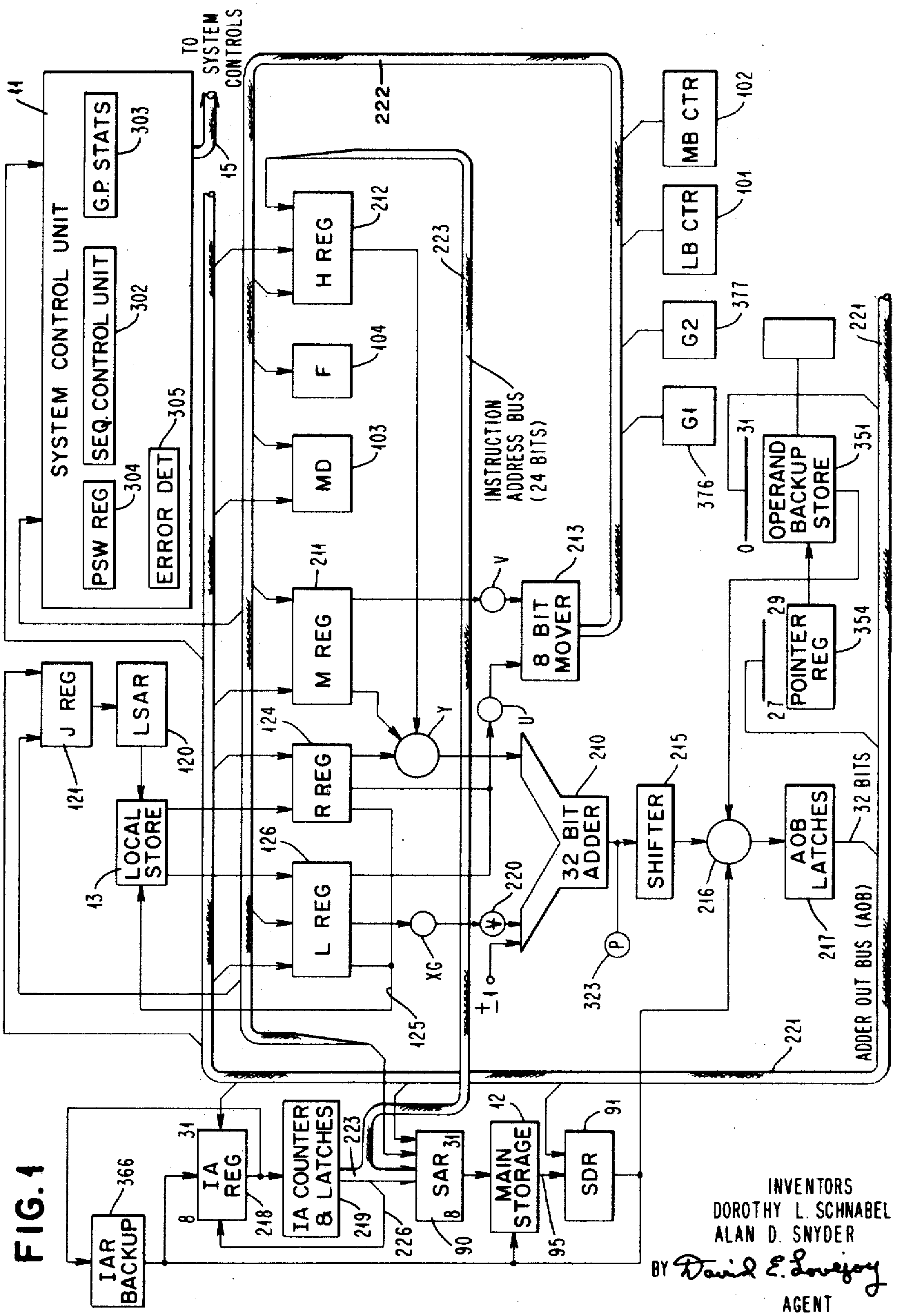
FIG. 1 depicts the system configuration of the present invention as implemented in a basic environmental system.

With reference to FIG. 1, the system storage includes main storage (MS) 12 and local storage (LS) 13. Although no special input/output units are shown, such units are well-known and communicate with the FIG. 1 system through the gating network 216 into the AOB LATCHES 217 onto the adder output (AOB) 221. The system control unit 11 controls the system operation by opening and closing gates and establishing other control signals at extensive locations throughout the system. Since such gating and control signals and their implementation are well known, they are collectively represented by the output bus 15. Specific control signals important to the present invention will be discussed further hereinafter. The remainder of the circuitry shown in FIG. 1 is generally considered part of the CPU. The CPU and the system have the capability of executing store-in-place instructions.

Main store

The main storage (MS) 12 may be physically integrated with the CPU or constructed as a stand-alone unit. The storage cycle speed is not directly related to the internal cycling of the CPU, thereby permitting an efficient relationship of CPU speed to storage width. Fetching and storage of data by the CPU are not affected by any concurrent I/O data transfer.

The main store 12 is preferably a matrix array of magnetic cores where a given address in the array is selected by signals in the storage address register (SAR) 90. When the SAR 90 contains a main store address, the main store 12, under its own internal timing controls, operates through its basic memory cycle to read information onto output sense lines 95 into the storage data register (SDR) 91. From SDR 91, data may be regenerated back into MS 12 and to the gating circuitry 216, the AOB LATCHES 217, onto the added output (AOB) 221.

The basic memory cycle includes a read half cycle in which data is destructively read out from main storage into the SDR followed by a write half cycle in which the information in the SDR is regenerated back into main storage. By placing different information into the SDR 91 prior to regeneration on the write cycle, the information that was in main storage is effectively changed. Simultaneously with the regeneration cycle, the information in the SDR 91 becomes available to the system on the AOB 221. For further details as to the timing, control, and general operation of MS 12 reference should be made to the above-identified Krygowski et al. application.

The information format of the environmental system organizes 8-bits into a basic building block called a "byte." Each byte also includes a ninth bit for parity used in error detection. The parity bit cannot be effected by the program, its only purpose being to cause an interruption when a parity error occurs. Although express mention of the ninth bit in each byte will generally not be made throughout this specification, it is assumed that the parity bit will be associated with bytes and that the normal parity checking circuitry is included throughout the system in the well-known manner.

Two bytes are organized into a larger field defined as a half-word, and four bytes or two half-words are organized into a still larger field called a word. More specifically, a "word" is defined as four consecutive bytes in the environmental system and will be treated as such in this invention. However, it will be understood that words or bytes can equal any number of bits.

Various data formats may be employed in the environmental system so that instructions and operands may be of different lengths depending upon the particular operation which is to be carried out.

Bytes are assigned locations in storage in consecutively numbered positions starting with zero. Each number is considered the address of the corresponding byte. A group of bytes in storage is addressed by the leftmost byte of the group. The number of bytes in the group is either implied or explicitly defined by the operation specified by the instruction. The addressing arrangement uses a 24-bit binary address to accommodate a maximum of 16, 777, 216 byte addresses. This set of main storage addresses includes some locations reserved for special purposes.

Storage addressing wraps around from the maximum byte address to the zero address. Variable-length operands may be located partially in the last and partially in the first location of storage, and are processed without any special indication of crossing the maximum address boundary.

Fixed-length fields, such as half-words and double-words, must be located in main storage on an integral boundary for that unit of information.

A boundary is called intregal for a unit of information when its storage address is a multiple of the length of the unit in bytes. For example, words (4 bytes) must be located in storage so that their address is a multiple of the number 4. Variable-length fields are not limited to intregal boundaries, and may start on any byte location.

Local store

Local store (LS) 13 consists of 64 one word capacity registers which are addressed by the local store address register (LSAR) 120. The LSAR 120 is loaded from the J register (J REG) 121 which is in turn fed from the AOB 221 or the mover out bus (MOB) 222. Whenever a read operation is specified from LS 13, the addressed word in LS 13 is read out either to the L register (L REG) 126 or to the R register (R REG) 124. The L and R registers have their outputs gated either back to the LS 13 or to the adder 210.

Local store 13 has a READ and WRITE operation similar to that of the main store 12 and the specific details of operation will be found in the above-mentioned Krygowski et al. application.

Sixteen of the 64 one word locations in LS 13 are designated as general registers which are used as index registers in address arithmetic and indexing, and used as accumulators in fixed-point arithmetic and logical operations. These general registers are identified by numbers 0–15 and are specified by a 4-bit field in instructions. Additionally, LS 13 includes working store (WS) locations which are used for various purposes throughout processing.

Central processing unit (CPU)

There are three basic data-bus lines that are different in width, and through which data is channeled from one register to another. These are the 32-bit adder-out bus (AOB) 221, the 24-bit instruction-address bus (IAB) 223, and the 8-bit mover-out bus (MOB) 222.

The basic environmental system data flow consists primarily of two parallel paths which may be activated simultaneously. One is the 32-bit wide adder path including the adder 210 which is fed by the several 32-bit registers L, R, M and H. The other path is the 8-bit wide logical mover path including the 8-bit mover 213 fed by the L, R and M registers. The mover manipulates one-byte blocks in half-byte increments.

In addition to the adder and mover data paths, four other data paths are of interest in describing the basic environmental system. Mainly, the shifter, instruction address, local storage, and main storage data paths.

The adder is capable of performing both binary and decimal arithmetic. Decimal arithmetic is performed by doing a binary add (true or complement) and generating a decimal correction factor into the L register in the same CPU cycle. Another cycle is needed to subtract the correction factor from the results of the preceding cycle. The adder 210 includes, besides 32 individual adder units, four parity checking circuits (one for each byte), four parity generating circuits (one for each byte), as well as carry look-ahead circuitry. When performing arithmetic functions, data is gated to the right-adder input Y from the 32-bit register H, M, or R. The left adder input XG contains a true/complement gate 220 and is fed by the 32-bit L register 126.

In a single CPU cycle, two 32-bit operands are gated one each into the XG and Y adder inputs, passed through the adder and continue on to set the adder output latches 217. At the end of the CPU cycle, the adder output is in the latches 217 ready to be gated out into an operating register. In the basic environmental system, subtraction is achieved by use of the two's complement which is controlled by the true/complement gate 220 on the XG input. When the complement gate is set, bits gated into XG will be inverted (i.e., one's become zeros and zeros become ones), thus forming the one's complement of the original XG input. The two's complement is achieved by inserting a carry into the XG adder input. Multiplication and division are accomplished using the adder by taking successive additions and subtractions. The various gating and control signals necessary to carry out the adder functions described emanate from the system control unit 11 which will be described in more detail hereinafter.

The shifter data path runs from the adder 210 to the AOB latches 217 and enables the adder output to be shifted to the left or the right either one or four places. Additionally, the shifter 215 includes means not shown for saving and storing the overflow portions of any shifted data. Again, the shifter is controlled by the system control unit 11.

The mover data path is used primarily for the execution of variable-field-length (VFL) instructions. Two byte sources may be selected simultaneously for a logical operation by the mover. The left-mover input, U, may be a byte selected from the L register under the control of one of the two byte counters LB 101 and MB 102, a byte formed by the contents of the two four-bit registers MD 103 and F 104. The right mover input, V is a byte selected from the M register 211 under control of either byte counter LB or MB. The mover, like the other data paths, is controlled by the system control unit 11.

The instruction address data path is 24 bits wide for moving and updating the 24-bit instruction contained in the instruction address register 218. The first instruction is initially set in the instruction address register (IAR) by the system control unit 11. Instructions are gated from the IAR 218 to the instruction address counter and latches 219. The instruction address counter increments the instruction address by the appropriate number of bytes (6 bytes in the case of restore in place or SS instructions) and places that updated address in the IAR via the bus 226. The current instruction address, before updating, represents the location in the main store 12 of the current instruction to be executed and it is read into the storage address register (SAR) 90, gated to the main storage 12, and causes the addressed instruction to be read out into the storage data register (SDR) 91. Instructions read out from main store 12 into the SDR pass through the gating circuitry 216 to the AOB latches 217. The sequence of gating out an instruction is called I-fetch and is broken down into first and second level I-fetch. During I-fetch, the instruction is read out and is used to set up the CPU and local store with various initial conditions prior to commencement of execution.

The main storage and local storage data paths were previously discussed in connection with the above subheadings Main Store and Local Store.

System control unit

The system control unit 11 includes a sequence control unit 302, general purpose stats 303, a program status word (PSW) register 304, and error detection circuitry 305.

Figure 2:
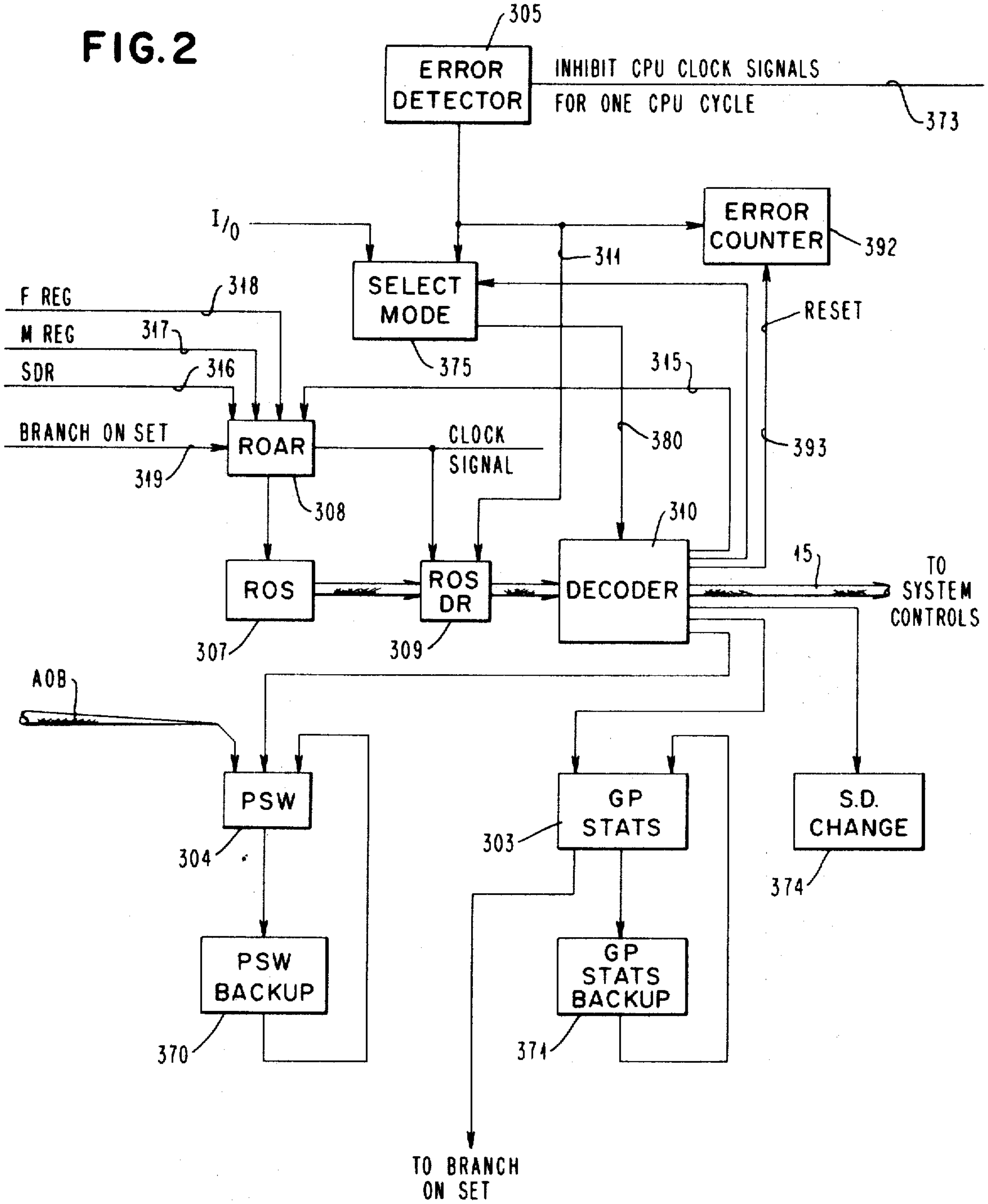
FIG. 2 depicts the system control unit 11 in FIG. 1 in greater detail.

Further details of the environmental system control unit 11 are shown in FIG. 2 along with circuitry added for the purposes of the present invention. The sequence control unit 302 basically includes a read only store (ROS) 307 which is addressed by a read only store address register (ROAR) 308. Upon selection of an appropriate address by ROAR 308, ROS 307 reads out a control word into the read only storage data register (ROSDR) 309. The control word set in ROSDR 309 controls the action of the processor for one machine cycle, a new control word being read out prior to each new CPU cycle. The control words in ROSDR are gated through the decoding circuitry 310 to the various gates and control circuits of the system via bus 15. For example, bus 15 connects to gates (not shown) on all of the L, R, M, and H registers and controls the gatiag of data in and out of those registers. Similarly, virtually all of the units shown in FIG. 1 include such gating facilities although they have not been shown in order to make the drawings clear. Words are organized in ROS 307 in microword sequences where the next word in the sequence is partially determined by the previous word via a portion which is returned to ROAR 308 from the decoder 310 via the return bus 315. A sequence of ROS words sets up the necessary controls for many cycles of CPU operation thereby allowing the CPU to carry out many varied data manipulations. In addition to the input from the decoder 310, the particular sequence is partially selected by inputs from the SDR 91, the M register and the F register via lines 316, 317 and 318, respectively. Additionally, as an aid to selecting a different ROS routine or control word as a function of some machine condition or data value, the ROAR 308 has a branch-on-set input 319 which controls whether or not to branch to a specified ROS address as a function of whether or not a general purpose stat condition code in PSW, or other settable control has been set. The general purpose stats 303 or other settable controls can be set by the decoder 310 or by other inputs within the data processing system.

The program status word register 304 includes status and control information used in carrying out the various control functions of the system and is used to record the current status of the system. The PSW 304 can be set from the AOB 221.

The error detection circuitry 305 comprises the normal parity checking circuitry as indicated, for example, by the parity check 323 on the output of the adder 210, in FIG. 1. Parity checking circuits appear throughout the FIG. 1 system and all feed the error detection circuitry 305 in any well-known manner.

OPERATION OF BASIC ENVIRONMENTAL SYSTEM

Figure 3:
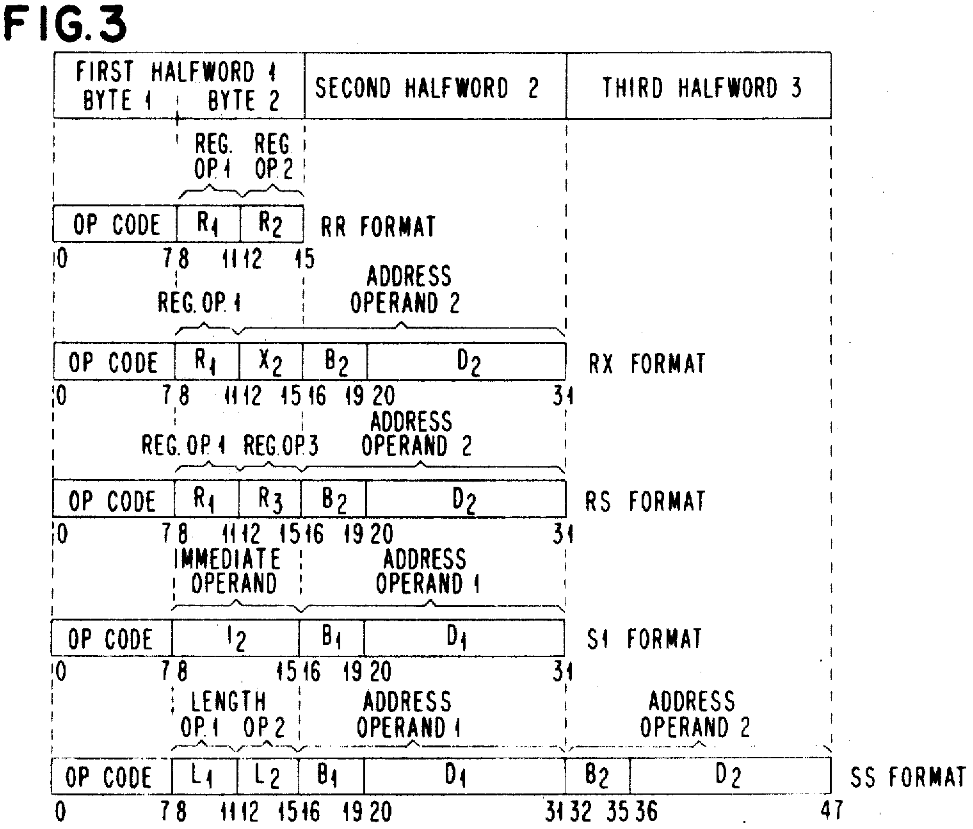
FIG. 3 depicts the instruction formats used in the system of FIG. 1.

The operation of the basic environmental system is controlled by instructions. The instructions are fetched from main storage to the SDR under control of the instruction address register. The type of operation to be carried out is determined in part by the particular format of the instructions to be used. The various types of formats possible are shown in FIG. 3. Although five basic instruction formats are possible, the SS format will be discussed, by way of example, in this specification. For the purpose of describing the execution of instructions, operands are designated as first and second operands with a "1" being used to identify information associated with the first and "2" being used to designate the second. As shown in FIG. 3, bits 0–7 contain the Op code; bits 8–11, the operand 1 byte length, L1; bits 12–15, the operand 2 byte length, L2; bits 16–19, the operand 1 base address, B1; bits 20–31, the operand 1 displacement, D1; and bits 31–47, the operand 2 base address, B2, and displacement D2, as indicated.

For addressing purposes, the B field of the SS instruction specifies the contents of one of 16 general purpose registers in the local store. The contents of that register is a 24-bit number which, when added to the D field in the SS instruction, equals the leftmost byte address in main storage of the respective operand. More particularly, the number in the general purpose register specified by B1 plus D1 specifies in binary notation the main storage address of operand 1. The L1 field specifies the number of bytes from that leftmost byte in main store which operand 1 extends to.

Normally, the operation of the processing unit is controlled by instructions taken in sequence. The process of fetching instructions is called I-fetch and is broken down into first and second levels during which various counters and registers are set with the appropriate fields derived from the instructions.

Figure 4:
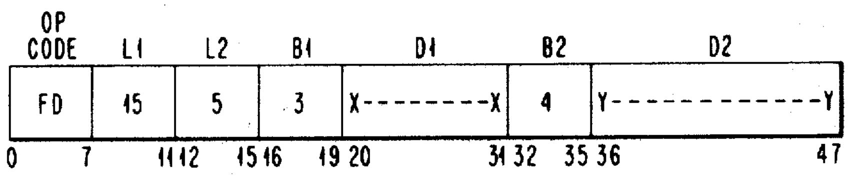
FIG. 4 depicts an exemplary decimal divide instruction using the SS format of FIG. 3.

A particular example of an SS instruction for a decimal divide operation is shown in FIG. 4. More particularly, the Op Code is FD which specifies a decimal divide type operation. L1 is 15 indicating that the first operand is L1 plus 1 bytes in length, that is, 16 bytes. Similarly, L2 is five indicating that operand 2 is L2 plus 1 in length, that is 6 bytes. B1 is set to three indicating that the base address for operand 1 appears in the local storage general purpose register 3. The general purpose register 3 will contain, as loaded during the initial program loading, a 24-bit base address which when added to the D1 displacement field of the FIG. 4 instruction will equal the main storage address of the leftmost byte of operand 1. In the example to be given, B1 plus D1 totals 1049. Similarly, the contents of general purpose register 4 plus the displacement D2 equals the main storage address of the leftmost byte of operand 2 which in the example to be given equals 513.

After completion of the first and second level I-fetch operations, the central processing unit has been set up with the following data in the following places.

| Location: | Content |
|---|---|
| R, WS (2) | Main storage address of the rightmost Op **2** byte. |
| L, M, H, WS (1) | Main storage address of the rightmost Op **1** byte. |
| F | Second hex digit of the Op code (first digit is F). |
| G1, MD | L1 field. |
| G2, J | L2 field. |
| MB | Byte address of the rightmost Op **1** byte. |
| LB | Byte address of the rightmost Op **2** byte. |
| WS (9) | Main storage address of the leftmost Op **1** byte. |
| WS (A) | Main stoarge address of the leftmost Op **2** byte. |

Figure 5:
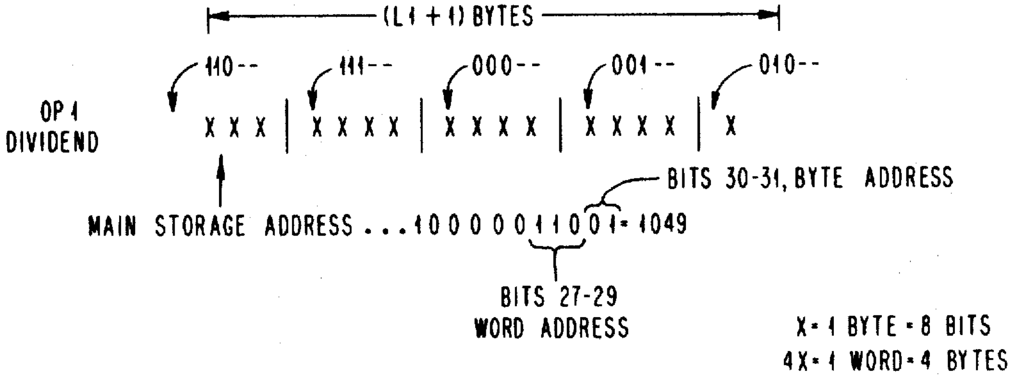
FIG. 5 depicts Operand 1 (dividend) used in executing the FIG. 4 instruction.

Assuming the address specified in general register 3 per the B1 field of the instruction in FIG. 4, when added to the displacement D1 equals a value of 1,049, then operand 1 (dividend) will appear (see FIG. 5) with its first byte in the 1,049 main storage location as shown. The X's in FIG. 5 represent bytes (8 bits) where the vertical lines between sets of four bytes indicate the word boundaries. Bits 30 and 31 of the main storage address (total address given by bits 8–31) specify a unique byte location within any given word. In a similar manner, bits 27 through 29 of the main storage address specify a unique word address for any given operand 1, since the dividend in decimal division is limited to four words maximum. However, since an Op 1 dividend does not necessarily begin on a word boundary, the maximum four-word operand as shown in FIG. 5 may be (and is in the example chosen) positioned over five memory words, namely, the 110--, 111--, 000--, 001--, and 010-- words as defined by the word address bits 27–29 select from the memory address bits 8–31.

Figure 6:
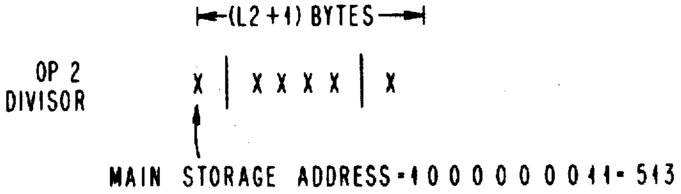
FIG. 6 depicts the Operand 2 (divisor) used in executing the FIG. 4 instruction.

In a similar manner FIG. 6 depicts the operand 2 (divisor) located beginning at memory address 513 and extending for six bytes to the right thereof, that is, for L2 plus 1 bytes.

Having specified the operand 1 and operand 2 addresses as determined after second level I-fetch, the next step in the processing operation is to fetch the operands from storage and begin the processing. Operand 2 is first fetched which takes three fetch cycles since fetches from main store are one word in length. Although processing by the CPU is on a byte at a time basis, all of operand 2 is fetched and stored in local store where the bytes are accessed as needed during the processing.

The operand 1 bytes are fetched a word at a time as they are needed throughout the decimal divide operation and the result (quotient plus reminder) exactly fills the Op 1 field. The quotient plus remainder are stored in the Op 1 field thereby destroying operand 1 and consequently changing the source data necessary to retry the decimal divide instruction.

Figure 7:
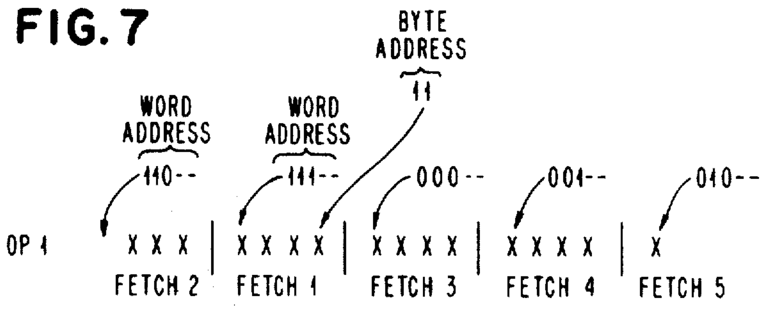
FIG. 7 depicts the order in which words comprising the FIG. 5 Operand 1 are fetched from main storage Operand 1 field.
Figure 8:
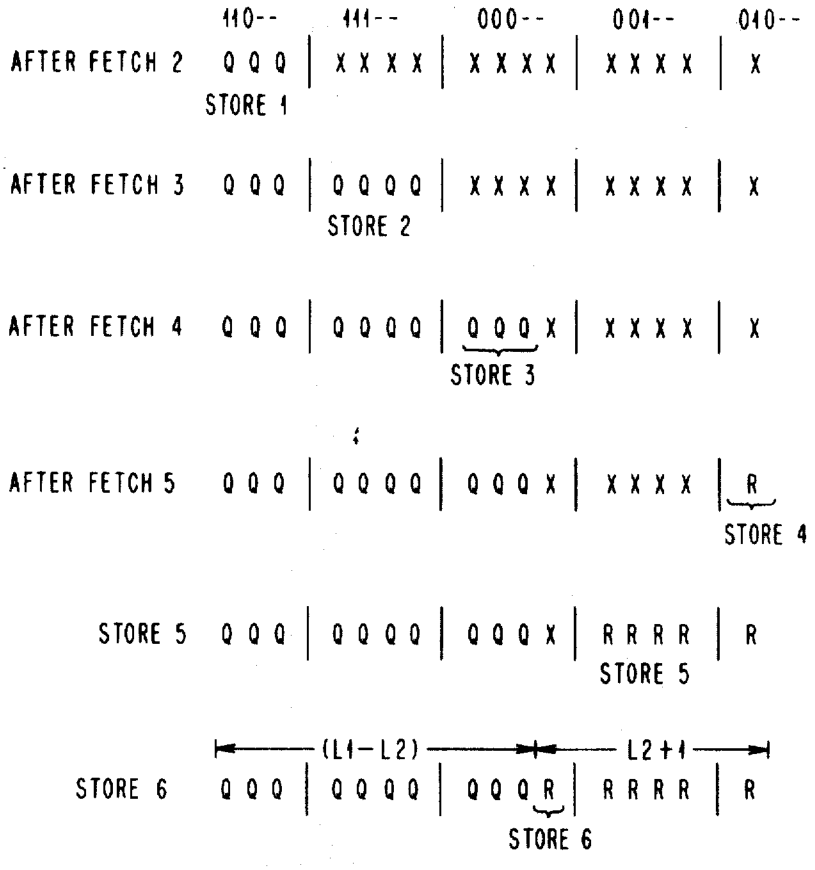
FIG. 8 depicts the manner in which Quotient (Q) and Remainder (R) bytes are stored in main storage in the Operand 1 field location.

With reference to FIG. 7, L2 plus 1 bytes of data are fetched from operand 1 starting with the rightmost word in the L2 plus 1 field of Op 1. Since each word in the operand can be uniquely identified for any given Operand 1 in a decimal instruction, by the 27 through 29 bits of the main storage address bits 8 through 31, FETCH 1 fetches the four bytes in word 111-- (using binary notation). Although the fourth byte (designated by main storage address bits 30 and 31) 11 (again using binary notation) is one more than the L2 plus 1 bytes required, it must be fetched during FETCH 1 since fetching is done on a word basis on word boundaries. After word 111-- has been fetched, the processing begins and the three high order bytes of the quotient are developed and are available at FETCH 2 time. Since the high order bits of the quotient have been developed during the processing of the 111-- word, they are available to be stored in the 110-- word location after that word has been retrieved during FETCH 2. Using Q's to designate stored quotient bytes, FIG. 8 shows the condition of the operand 1 field after FETCH 2 time. FIG. 8 indicates that after FETCH 2 fetches the Op 1 110-- word, the STORE 1 stores the three high order quotient bytes into the 110-- field thereby detsorying the source data X bytes that were contained therein. Similarly, after the FETCH 3 cycle, the STORE 2 stores the Q bytes into the 111-- address. After FETCH 4, the STORE 3 cycle stores the remaining three bytes of quotient into the 000-- word. After FETCH 5, the rightmost remainder bytes, R, have been developed and STORE 4 places the single R byte developed into the 010-- word. As the remainder bits are further developed, STORE 5 stores the remainder into the 001-- word, followed by a STORE 6 replacing the ---11 byte of the 000-- word with the final remainder byte. The above fetching and storing sequences illustrate the manner in which source data becomes changed during a decimal divide type instruction. More particularly, source data is first changed on the STORE 1 operation and any error occurring thereafter cannot be retried in the prior art basic environmental system.

The actual divide operation which incorporates the above FETCH and STORE operations consists of five sequences:

(1) Fetch and right-align and digit value of operand 2 (divisor) and make certain tests to see that the appropriate criteria are met for a divide operation.

(2) Fetch and right-align the high-order L2 plus 1 bytes of operand 1 (assemble dividend) taking the rightmost word of the L2 plus 1 bytes and make certain criteria tests.

(3) Complement-add the aligned divisor to the assembled dividend until an overdraw occurs. The M/D counter 103 (FIG. 1) is used to count the reductions. When the overdraw occurs, the M/D is one higher than the developed quotient digit.

(4) True add the aligned divisor to the overdraw result from step (3). The M/D counter is corrected (minus 1) and stored as a quotient digit in the leftmost operand 1 byte field. Thereafter, if the last quotient digit is stored, go directly to (5). If the quotient digit is not the last one, shift the step (4) value left and enter the next dividend digit to the units position of the assembled dividend and go to (3).

(5) Develop and store the quotient sign. Then store the assembled dividend value from step (4) as the remainder in the rightmost L2 plus 1 bytes of the Op 1 field. Then return to I-fetch for a new instruction.

In carrying out the above decimal divide operation, the M register is used for the operand 1 data fields and the H register is used for the operand 1 address in main storage. The MB counter determines which byte of the operand 1 word is to be used as a part of the current execution routine and when this counter equals zero the word in the CPU is exhausted and another word from main storage must be fetched, per the above fetching sequence, before the execution can continue. The G1 counter 376 (FIG. 1) indicates the remaining bytes to be processed in the operand 1 field. With respect to operand 2, the LB counter, the G2 counter 377 (FIG. 1), the L register and the R register function for operand 2 as the MB counter, the G1 counter, the M register and the H register, respectively, for operand 1.

DETAILED DESCRIPTION OF THE PRESENT INVENTION

The present invention is directed to retry apparatus which is added to a data processing system such as the above described basic environmental system. The retry apparatus allows such a system to overcome the effects of transient errors and allows a correct instruction execution retry on error even where source data has been changed. The problem of source data change which normally precludes retry of an instruction is overcome by providing an operand backup store and backup store address register (pointer register) where the backup store is relatively small (only 8 words in one particular embodiment) yet still retains all of the operand source data which may be changed during particular instruction execution. The retry apparatus operates without degrading system performance absent the occurrence of an error. Additionally, instructions may be retried as many times as desired. If an error occurs during the retry, another retry is merely attempted. This multiple retry is particularly effective in overcoming relatively long transient errors.

With reference to FIG. 1, the operand backup store 351 is loaded from information appearing on the AOB 221 in a manner to be described in more detail hereinafter. The particular one of eight words stored in the operand backup store 351 is controlled by the address (pointer) register 354. The pointer register 354 is also set, under appropriate gating from the system control unit 11, by bits 27 through 29 of the operand address bits 8 through 31 which appear on the AOB 221 in connection with main storage addressing of Operand 1.

Figure 9:
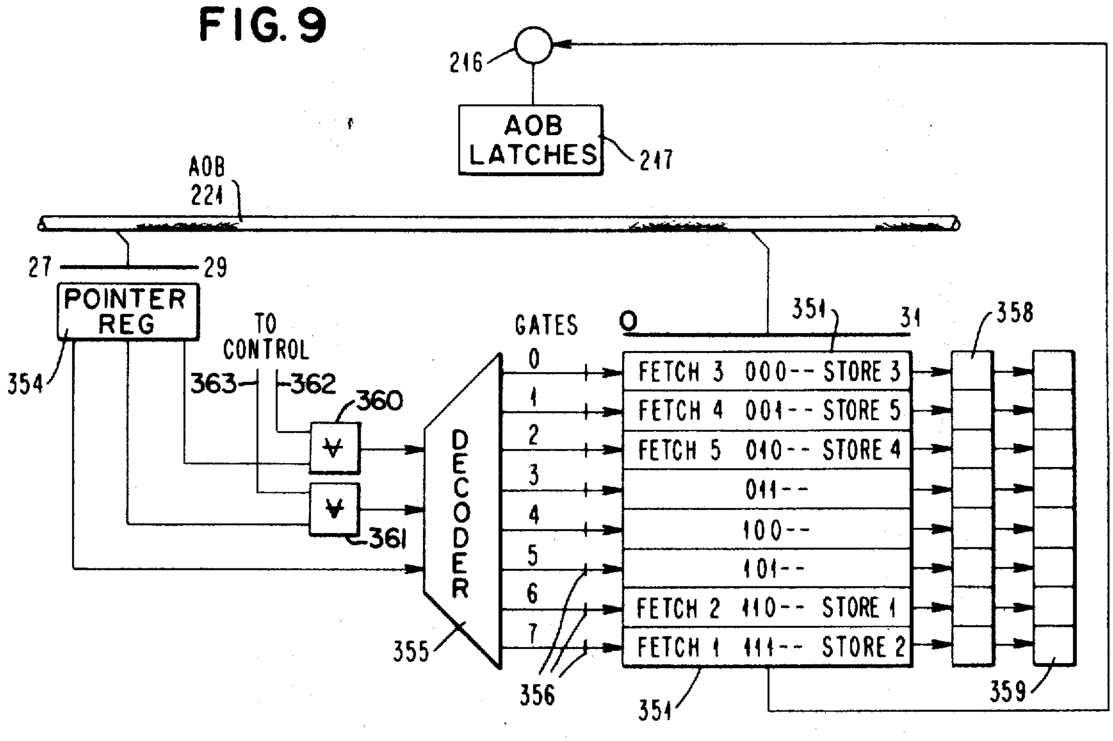
FIG. 9 depicts the details of the backup store, backup store address register, and controls added by the present invention to the basic environmental system.

With reference to FIG. 9 which shows further details of the pointer register and operand backup store, the pointer register receives the word address bits 27 through 29 as defined in connection with the above basic environmental system. The bits 27 through 29 are decoded in a conventional decoder 355 to set the eight gates 356 (0 through 7) which in turn select one of the 8 word locations in the operand backup store 351. The bus 352 is then operative to store, under the same gate control as is used to gate Operand 1 words onto the AOB, to set the addressed operand word into the word location in the operand back up store. The location in the backup store corresponds to the Operand 1 word address in main storage as was defined by bits 27 through 29 of the main store address code. When a word has been correctly (no error detected) stored in the operand backup store, the corresponding fetch set trigger of the fetch set trigger 358 is set. When a store occurs from the CPU to the location in main storage which corresponds to an operand location which has been previously set in the operand backup store 351, the fetch triggers 358 inhibit a change of the data in the backup store 351, but cause the corresponding trigger 359 to be set indicating that source data has been changed in main memory and that the operand backup store is the only location which at that time holds the source data operand necessary for retry.

In addition to the operand backup store 351 and its associated circuitry, the system includes an instruction address register backup 366 as shown in FIG. 1. The IAR backup register 366 merely holds the instruction address which is being executed until it is ascertained that the execution was error free, that is, no error detected. The instruction address register 218, as described above, is updated during normal processing before execution completion and, therefore, does not address of the current instruction. For that reason, I-fetch cannot be returned to without aid of the backup register 366 or some other means of reloading the instruction address register prior to retry. When the system control unit 11 is operating in the retry mode, the sequence control unit 302 gates the backup register 366 into the instruction address register 218 at the appropriate time before I-fetch. The function of restoring the instruction address register from a backup store should be distinguished from the problem of restoring operand storage. Operand source data may or may not have been changed, the particular operand field location in storage is not conveniently known, and even if the operand field is known, the particular bytes within the field which have been changed may be out of order with respect to sequential memory addresses (for example, the decimal divide illustration given above). On the other hand, the instruction address register backup store 366 merely has one field which always goes into the same location and must always be restored before retry.

With reference to FIG. 2, additional backup circuitry is shown for parts of the control unit circuitry which are changed during the normal execution of an instruction or upon detection of an error. More particularly, the PSW register 304 includes a backup register 370 for restoring the condition code bits in the program status word. The general purpose stats 303 include backup stats 371 which are used to restore the general purpose stats when the system control unit branches on detection of an error to the retry mode of operation. Additionally, the error detection circuitry 305 gives an inhibit CPU clock signal for one CPU cycle when an error has been detected in order to immediately stop further CPU processing. The ROS clock is not stopped, thereby allowing the retry mode to be entered. In addition to the backup circuitry described, the decoder 310 sets a source data change trigger 374 whenever source data is changed no matter what function the data processing system is performing. Although the source data change trigger 374 can be set by the decoder 310, it can be alternatively set, for the purposes of the present invention, by OR'ing all the store set triggers 359 (FIG. 9) and using the output of that OR (not shown) to set the source data change trigger. The source data change trigger 374 is used, while attempting to retry, as a signal to branch to a restore routine after second level I-fetch. The main store is then restored with the data appearing in the operand backup store 351 by a special restore sequence in the ROS 307.

The select mode circuitry 375 is present in the basic environmental system and is used to select whether or not the system will operate in the I/O mode or CPU mode. In the present invention, the select mode circuitry 375 is also is responsive to the error detector circuitry 305 for selecting a retry mode of operation which is implemented by controlling the manner in which the words in ROSDR are decoded by decoder 310. Circuitry 375 may be merely a three way switch passing a signal via lines 380 to decoder 310. The retry mode is selected on error detection by forcing an all zero address (the address of the first word of the retry sequence) into ROAR. The all zeros address is forced by inhibiting the readout of ROSDR via inhibit line 311 which in turn forces all zeros on the return bus 315. It should be recalled that line 373 inhibited, for one CPU cycle, the CPU clock so that the F REG, M REG, and SDR inputs to ROAR are also zero which forces a retry mode address into the ROAR 308. When the retry mode is addressed, a retry sequence is read out of ROS 307 to carry out the restoration of the PSW 304 the general purpose stats 303 and the instruction address register 218. For the purposes of the present invention, these and other "housecleaning" operations may be done in a conventional well-known manner. However, when the CPU is performing functions for which the retry apparatus of the present invention will not handle, the select mode circuitry 375 and additional sequential control hardware as described in the above cross-reference related application No. 3 may be employed.

Operation of the invention

During normal operation, after first and second level I-fetch, operand 2 (see FIG. 6) is fetched to local store 13 from main store 12. After operand 2 has been fetched, the 111-- (using binary notation) word of operand 1 (see FIG. 5) is addressed in main storage 12 by gating its 24-bit memory address from the H register 212 through the adder 210 (without change) to the AOB latches 217. In normal operation and in the present invention, the 111-- word's address is then gated via the AOB 221 to the SAR 90. In the present invention, bits 27–29 of the 24-bit memory address (bits 8–31) are also gated into the pointer register 354 all under control of the sequence control unit 302 in the system control unit 11. With the operand 1 word 111-- address in SAR 90, main storage 12 reads out the 111-- word into the SDR 91 from where it is gated through gating circuitry 216 into the AOB latches 217. From the AOB latches 217, the operand 1 word is normally gated to the L register 126. In the present invention, the operand 1 word is also gated into the operand backup store 351 via the AOB 221. As indicated in FIG. 7 for operand, FETCH 1 places the 111-- word into the last word position of the store 351 since the seventh gate 356 was set in decoding the 27–29 bits placed in the pointer register 354 (see FIG. 9) during the setting of SAR. When word 111-- has been correctly fetched and stored in store 351, the associated trigger 358 is set indicating that FETCH 1 is complete.

After FETCH 1, the CPU begins processing the decimal divide instruction forming the high order quotient bytes as a result of processing the 111-- word of operand 1 with the divisor (operand 2). The quotient bytes are stored as developed until the three bytes from the 111-- word have been exhausted. (The fourth byte is not within the L2 plus 1 bytes which are initially used.) After those three bytes of the 111-- word have been used, the H register 212 has been updated with the address of the next word to be fetched, namely the 110-- word. Accordingly, that updated address in the H register is transferred via the AOB 221 to the SAR 90 simultaneously sending bits 27 through 29 into the pointer register 354.

When the MB byte counter 102 indicates that all bytes in the 111-- word have been exhausted, FETCH 2 is initiated by reading the updated address in the H register 212 onto the AOB 221 and into SAR 90 to address the 110-- word in main storage 12. When that address appears on the AOB, it is gated under control of the sequence control unit 302 into the bit 27 through 29 pointer register 354. In the same manner as was done during the FETCH 1 cycle, the 110-- word is read out into the SDR through the AOB latches 217 onto the AOB and into the L register 126. Simultaneously with gating onto the AOB, the 110-- word is placed in the sixth word position of backup store 351. After the 110-- word is fetched, the high order quotient bytes are gated from the M register through the adder 210 without change to the AOB and into the SDR 91. From the SDR 91 they are regenerated into the main storage 12 in the 110-- (high order word field of operand 1) thereby destroying 110-- word of operand 1 source data in main storage. When the quotient bytes are gated into the SDR and regenerated into the main storage 12, the sixth store trigger of the store triggers 359 is set indicating that the backup store word 110-- is now the only source of source data that is necessary if retry is attempted.

The remaining STORE and FETCH sequences are carried out during normal processing as indicated in FIGS. 7 and 8. At the appropriate times, the fetch triggers 358 and store triggers 359 are set.

When the STORE 1 occurs, the source data change trigger 374 (see FIG. 2) is set thereby indicating that retry cannot be accomplished without restoring main storage 12 with those operands in the backup store 351 which have their associated trigger 359 set.

If an error does occur any time after processing begins, error detector circuitry 305 (see FIG. 2) then inhibits the CPU clock (not shown) via line 373 for one CPU cycle and gives a signal to the select mode circuitry 375 which forces an address in ROAR 308 of a retry sequence in ROS 307. The retry sequence would carry out normal house-cleaning functions such as resetting from backup store, the general purpose stats 303 and the PSW register 304 and the instruction address register 218. Thereafter, the retry sequence in ROS branches back to I-fetch and starts the instruction execution procedure. During second level I-fetch, the source data change trigger is queried and if set will cause ROS 307 to branch to a restore routine. The restore routine uses the main memory address of operand 1 to restore the backup operands from store 351 to main storage 12. Starting with word address 110--, the main memory 24-bit address, as calculated from the B1 plus D1 sum during 2nd level I-fetch, is gated via the AOB to the SAR. Simultaneously, the 110-- word address bits 27–29 (of the 24 bits 8–31) are placed in the pointer register 354 thereby selecting the sixth word in storage 351. All of the mentioned operations are carried out, of course, under ROS sequence control. If the store trigger 358 associated with the 110-- word position has been set, then the 110-- operand is gated from storage 351 through the gating circuitry 216 to the AOB latches 217. From the AOB latches, the operand is gated into the SDR from where it is regenerated into the main storage 12 to the correct memory address in main storage.

After the 110-- word has been restored, the main storage address is incremented by one word so that the 111-- word is next restored in memory in the same manner as was the 110-- word. This process is continued for five and only five one word increments, checking each time to ascertain if the associated storage trigger 358 has been set. If the storage trigger 358 has not been set, then no main storage data is restored from the backup register for that particular word. It is only necessary to scan through five of the eight possible words since the decimal divide operands at most are distributed over five words. Beginning with the high order word, in this case the 110-- word, the word addresses wrap around from 111-- to 000--.

Alternate embodiment

Although the invention has been explained in connection with a particular SS decimal divide instruction, the invention can be employed using other instruction formats and for carrying out other Op codes. For example, using the RR or RS format as shown in FIG. 3, source data may be stored in the backup source 351 using the backup store address register 354 coupled with the inverters 360 and 361 to reverse the zero and one word location in the storage 351. This alternate use of the backup store 351 is initiated by signals on lines 362 and 363 from the decoder 310 of the sequence control unit 302 when, for example, a floating point Op code is used. Accordingly, the function and operation of the backup store 351 changes, under sequence control unit control, as a function of the particular instruction and Op code that is being executed. All of the above, of course, is carried out in a manner transparent to the program.

Although the size of the backup store has been selected as 8 words, the size is of course dependent upon the operand size. If in the present invention, decimal divide operands were extended to five, six or seven words in length, then the present 8 word backup store embodiment would still be adequate to handle that expansion. However, if more than seven word operands were allowed, then the number of words of backup store and the number of bits in the backup store address register 354 would also have to be expanded accordingly.

Although the sequence control unit 302 (shown in detail in FIG. 2) of the system control unit 11 has been depicted in one preferred embodiment of the present invention as a read only store (ROS) and associated circuitry, it is clear that the sequence control unit 302 could be implemented using sequential logic circuitry.

The control circuitry of FIG. 2 may contain an error counter 392 which counts the number of errors detected by error detector 305. The retry sequence may use the count in counter 392 to set up a branch to an error analysis sequence or to otherwise stop the attempts at retrying the current instruction. The error counter would contain a reset line 393 to reset the counter after a successful execution of the instruction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system including a control unit, a processing unit, and a storage unit wherein said units include error detection means and where said system is operative during normal processing (1) to manipulate data by fetching operand words from a field in storage to the processing unit, (2) to process said operand words to form results, and (3) to change the contents of said field by storing said results in said field; improved instruction retry apparatus comprising:

- a backup store comprising a plurality of backup store locations for storing, under control of the control means, operand words fetched from said field during normal processing;
- backup store address means connected to said backup store and operative under control of said control means for selecting, for each fetched operand word, a backup store location which corresponds to the location of said fetched operand word in said field; and
- means responsive to said error detection means upon detection of an error for signalling said control means to replace changed contents of said field with operand words in said backup store so as to enable retry of the data manipulation.

2. The apparatus of claim 1 further including an error counter, connected to said error detection means, for counting the number of erroneous attempts at data manipulation, said control unit being operative when said counter reaches a predetermined count N to cause said system to stop retrying said data manipulation.

3. The apparatus of claim 1 further including a source data change trigger operative to be set by said control means when a first change is stored in said field, said control means operative to replace said change only if said source data change trigger is set.

4. The apparatus of claim 1 additionally comprising a plurality of indicators, each associated with one backup store location, one of said indicators being set by said control means when a change is stored, in said storage unit, in the field location from which the word in the backup store location corresponding to said one of said indicators was fetched, said control means being operative to replace only those words having an associated indicator set.

5. In a data processing system including a control unit, a central processing unit, and a storage unit wherein said units include error detection means and where said system is operative to (1) execute a current instruction by fetching from storage to the central processing unit operand 1 words from an operand 1 field and operand 2 words, (2) process said operand words to form results, and (3) change the contents of said operand 1 field by storing said results in said operand 1 field; improved instruction retry apparatus comprising;

- a plurality of backup store locations for storing, under control of the control means, operand 1 words fetched from storage in the operation of executing the current instruction;
- backup store address means connected to said backup store and operative, under control of the control means, for selecting for each fetched operand 1 word a backup store location which corresponds to the operand 1 word's location within said operand 1 field, said address means being set in the operation of executing the current instruction; and
- means responsive to said error detection means, upon detection of an error during execution of the current instruction for signalling said control means to replace changed contents of said operand 1 field with operand 1 words in said backup store so as to enable retry of the current instruction.

6. The apparatus of claim 5 further including an error counter, connected to said error detection means, for counting the number of erroneous attempts at executing the current instruction, said control unit being operative when said counter reaches a predetermined count N to cause said system to stop retrying said current instruction.

7. The apparatus of claim 5 including a source data change trigger operative to be set by said control means when a first change is stored in said operand 1 field, said control means operative to replace said change only if said source data change trigger is set.

8. The apparatus of claim 5 further including a plurality of indicators each associated with a backup store location, each indicator being set by said control means when a change is stored, in said storage unit, in the field location from which the word in the backup store location corresponding to the indicator was fetched, said control means being operative to replace only those words which have an associated indicator set.

9. In a data processing system including a control unit, a processing unit, and a storage unit wherein said units include error detection means and wherein said processing unit is connected by a bus to said storage unit; said system being operative to execute a current instruction by fetching, during a normal fetch cycle, operand words over said bus from at least a first field in storage, operative to process said words to form results, and operative to change the contents of said first field by storing said results in said first field; improved instruction retry apparatus comprising,

- a backup store including a plurality of word locations for storing operand words fetched from said first field, said backup store being connected under control of said control means to said bus to receive operand words during said normal fetch cycle and to deliver operand words during a restore cycle;
- backup store address means connected to said backup store and operative, under control of the control means, for selecting a backup store location for each operand word fetched from said first field corresponding to the location of said operand word within said first field;
- a plurality of indicator means, each one associated with a different word location in said backup store, each indicator means being set by said control means when changes are stored in said storage unit in the first field location from which the word in the associated backup store was fetched; and
- means responsive to said error detection means, upon detection of an error during execution of the current instruction, for signalling said control means to replace contents in said first field with operand words stored in said backup store, said control means reading out only backup store locations having an associated indicator set.

10. The apparatus of claim 9 further including an error counter connected to said error detection means for counting the number of erroneous attempts at executing the current instruction, said control unit being operative when said counter reaches a predetermined count N to cause said system to stop retrying said current instruction.

11. In a data processing system having a control unit including a sequence control unit, having a processing unit including operand address generation means and operand processing means, and having a storage unit including storage addressing means and storage output means; said system including a bus connecting said address generation means to said storage addressing means during an addressing cycle and connecting said output means to said operand processing means during a fetching or storing cycle; said system including error detection means; and said system operative to process operands a word at a time by fetching operand 2 from an operand 2 field in storage and alternatively fetching operand 1 words from an then changing the contents of an operand 1 field in storage; improved instruction retry apparatus comprising:

a backup store including a plurality of word locations for storing operand 1 words; said backup store being connected, under control of said sequence control means, to said bus to receive operand 1 words during said fetching cycle;

backup store address means connected to said backup store and operative, under control of the control means, for selecting a backup store location for each operand 1 word fetched corresponding to the location of said operand 1 word within said operand 1 field, said backup address means being connected to said bus and being set, under control of said sequence control means, by a portion of the address carried by said bus during the addressing cycle;

means responsive to said error detection means upon detection of an error during execution of the current instruction for signalling said control means to replace contents of said operand 1 field with operand 1 words in said backup store so as to enable retry of the current instruction.

12. The apparatus of claim 11 further including an error counter, connected to said error detection means, for counting the number of erroneous attempts at executing the current instruction, said sequence control unit being operative when said counter reaches a predetermined count N to cause said system to stop retrying execution of the current instruction.

13. The apparatus of claim 11 wherein said data processing system includes an instruction address register means for initiating fetching of the current instruction and wherein said apparatus further includes:

instruction address register backup means connected to said instruction address register means, operative under control of the sequence control means upon detection of an error for reloading the current instruction address in the instruction address register means so as to initiate a retry of the current instruction.

References Cited

UNITED STATES PATENTS

| | | | |
|---|---|---|---|
| 3,248,697 | 4/1966 | Montgomery | 340—146.1 |
| 3,339,183 | 8/1967 | Bock | 340—172.5 |
| 3,409,879 | 11/1968 | Keister | 340—172.5 |
| 3,440,619 | 4/1969 | Lehman et al. | 340—172.5 |
| 3,456,243 | 7/1969 | Cass | 340—172.5 |

PAUL J. HENON, Primary Examiner

H. E. SPRINGBORN, Assistant Examiner